April 13, 1948.  J. E. BLUDWORTH ET AL  2,439,416
DEHYDRATION PROCESS
Filed April 24, 1945
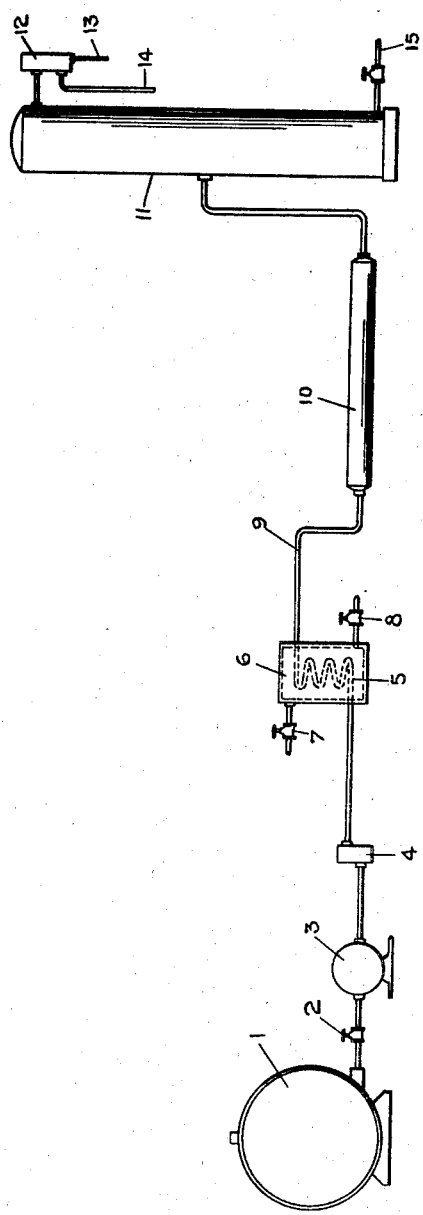
INVENTORS
JOSEPH E. BLUDWORTH
MAX O. ROBESON.
BY  HARRY A. TRUBY, JR.
ATTORNEYS.

Patented Apr. 13, 1948

2,439,416

UNITED STATES PATENT OFFICE 2,439,416

DEHYDRATION PROCESS

Joseph E. Bludworth, Max O. Robeson, and Harry A. Truby, Jr., Corpus Christi, Tex., assignors to Celanese Corporation of America, a corporation of Delaware Application April 24, 1945, Serial No. 590,092

6 Claims. (Cl. 260—547)

This invention relates to a dehydration process and relates more particularly to the catalytic vapor phase dehydration of propionic acid whereby propionic acid anhydride is formed.

An object of this invention is to provide an improved process for the production of propionic acid anhydride by the vapor phase dehydration of propionic acid.

Another object of this invention is the dehydration of propionic acid to form propionic acid anhydride in a highly efficient and economical manner with a minimum formation of thermal decomposition products.

Other objects of this invention will appear from the following detailed description and the accompanying drawing.

An economical process for the production of aliphatic acid anhydrides, such as acetic anhydride, comprises subjecting the concentrated acid to vapor-phase dehydration at an elevated temperature. The production of the acid anhydrides in good yield and with the minimum formation of thermal decomposition products is dependent not only upon the rapid removal of the water split off to avoid hydrolysis of the anhydride formed but also on the rapid passage of the reacting vapors through the reaction zone. Processes suitable for the pyrogenic dehydration of acetic acid for the production of acetic anhydride are not, however, entirely satisfactory when employed for the production of propionic acid anhydride from propionic acid. Propionic acid is much more susceptible to pyrogenic gaseous decomposition than acetic acid. Consequently, the pyrogenic dehydration of propionic acid normally produces substantial quantities of gaseous decomposition products with a relatively limited yield of propionic anhydride.

We have now found that propionic anhydride may be obtained in relatively high yield from propionic acid by pyrogenic dehydration with a minimum formation of gaseous decomposition products. In accordance with the novel process of our invention, this improved result may be obtained if propionic acid is subjected to pyrogenic vapor phase dehydration in the presence of a dehydration catalyst employing a pyrogenic dehydration temperature no greater than about 1100° F., said pyrogenic vapor phase dehydration being effected in the presence of an inert organic diluent which forms a constant boiling azeotrope with the water produced during dehydration. By effecting the pyrogenic dehydration under these conditions, decomposition is at a minimum and the water is removed from the propionic anhydride formed, thus avoiding any hydrolysis.

The temperature maintained during the pyrogenic dehydration reaction is exceedingly important and, as stated, should not be greater than about 1100° F., being preferably of the order of about 1030° F. We have found that operating above these temperatures causes a substantial proportion of the propionic acid to be decomposed into various gaseous decomposition products. When conducting the pyrogenic dehydration of propionic acid at 1100° F. or preferably just below, as indicated, practically none of the propionic acid is lost through gaseous decomposition. The temperature appears to be critical for economical and efficient operation.

Any suitable dehydration catalyst may be employed, such as, for example, monocalcium phosphate, but optimum results are obtained employing mono-sodium phosphate deposited on a suitable inert carrier such as, for example, pumice.

The inert organic diluent employed during pyrogenic dehydration of the propionic acid to propionic acid anhydride is first mixed with the acid and then vaporized simultaneously with the latter by passing the mixture through a steam heated vaporizer at a temperature of 200 to 360° F. The vapors issuing from the vaporizer are then passed through a reactor containing the dehydration catalyst, which reactor is preferably of a stainless steel, and heated to the reaction temperature employed, e. g. about 1100° F. or, preferably, just below said temperature. The diluent may be employed in amounts of from 1 to 20 parts by weight for each part by weight of propionic acid being dehydrated. While suitable diluents, such as carbon tetrachloride, ether, petroleum ether, or mixtures thereof may be employed, optimum results are obtained when employing benzene as the diluent and in amounts of from 3 to 8 parts by weight for each part by weight of propionic acid undergoing pyrogenic dehydration.

The preheating may take place in a separate vaporizer, as indicated above. However, the reactor in which the dehydration takes place may, if desired, serve as the vaporizer. Thus, if the reactor is sufficiently long, preheating and vaporization may take place in the forepart of the reactor, and the desired pyrogenic dehydration in the rear section of the reactor, where the catalyst is suitably disposed.

The vapors issuing from the reactor, comprising propionic acid anhydride, unreacted propionic acid, benzene and water, are fed into a suitable fractionating still where the benzene and water come off the top and the propionic acid anhydride and unreacted propionic acid are removed at the base of the still. The mixture of propionic acid and propionic acid anhydride is fed to a second still where the propionic acid is removed and then recycled in the process. The propionic acid anhydride may be further purified in a third column wherein high-boiling impurities are removed.

Usually, when the reaction is initiated, the benzene vapors are maintained in the still by refluxing a suitable amount of benzene through the still and the water, benzene, propionic acid and propionic acid anhydride vapors from the reactor are then passed to the still.

The accompanying drawing serves to illustrate, in diagrammatic form, one means for carrying out our invention, the drawing being given by way of illustration and is not to be considered as being in any way limitative.

Referring to the drawing, a mixture of propionic acid and benzene in the desired ratio contained in a suitable vessel 1, is drawn therefrom through a valve 2 by means of a pump 3 and is passed through a measuring device 4 which may be a rotameter or other suitable measuring mechanism. The mixture of liquids is passed through a coil 5 set in a steam heated vaporizer 6, the latter being provided with a valved steam inlet 7 and a valved outlet 8, where the liquids are vaporized. The heated mixture of benzene and propionic acid vapors is then passed through a pipe 9 into reactor 10, containing the dehydration catalyst, which is deposited on an inert carrier, such as pumice. The catalyst particles are of an average particle size of ⅛ to ½ inch. Reactor 10 which may be of stainless steel is maintained at a temperature below 1100° F. by suitable heating means. The desired pyrogenic vapor phase catalytic dehydration takes place in the reactor with the formation of propionic acid anhydride and water. The hot vapors comprising water, propionic acid anhydride and benzene are then passed to a distilling column 11. Benzene vapors are usually refluxed through column 11 at the start of the reaction. When the hot vapors issuing from reactor 10 enter the distilling column 11, the benzene in the form of a constant boiling azeotropic mixture with the water, is taken off at the top of the column, condensed in a condenser 12 and the water which separates from the condensed benzene is discharged through a pipe 13. The benzene is removed through a pipe 14 and recycled. Unreacted propionic acid and the propionic acid anhydride formed are removed through pipe 15 and separated in a second still (not shown) as described. Final purification may be effected, as stated, employing a third distilling column (not shown), where any high boiling compounds are removed from the propionic acid anhydride.

In order further to illustrate our invention but without being limited thereto, the following example is given:

Example

A mixture of propionic acid and benzene in the ratio of one part by weight of propionic acid to 5 parts by weight of benzene is passed through a metering device at the rate of 1230 parts by weight per minute and the metered mixture then vaporized in a steam heated vaporizer at a temperature of from about 210 to 230° F. The mixture of hot benzene and propionic acid vapors is then passed into a stainless steel reactor maintained at 1030° F. by suitable heating means, such as electrical resistance elements or gas flames, containing a dehydrating catalyst comprising mono-sodium phosphate deposited on an equal weight pumice. The catalyst particles are of an average size of about ¼ inch. The elevated temperature aided by the catalyst effects the pyrogenic dehydration of the propionic acid with the formation of propionic acid anhydride and water. The hot vapor mixture comprising water, propionic acid anhydride and the benzene diluent is then fed into the middle section of a fractionating still through which benzene is kept refluxing at the start of the dehydration reaction. The water vapors are removed at the top of the still in the form of an azeotropic mixture with the benzene. The azeotropic mixture is condensed, the water layer being discarded and the benzene being recycled where it is mixed with propionic acid for further reaction. A mixture of propionic acid anhydride and unreacted propionic acid is withdrawn from the base of the still and fractionated as described above.

By our novel pyrogenic dehydration process, the gaseous decomposition products formed during the dehydration of the propionic acid are less than 3% of the propionic acid feed. Operating at somewhat higher temperatures, for example, temperatures of 1160° F., the decomposition is of the order of over 28%, while at a slightly higher temperature, say 1184° F., over 57% of the propionic acid is decomposed into gaseous decomposition products such as carbon dioxide, and the like.

It is to be understood that the foregoing detailed description is given merely by way of illustration and that many variations may be made therein without departing from the spirit of our invention.

Having described our invention, what we desire to secure by Letters Patent is:

1. Process for the production of propionic acid anhydride, which comprises subjecting propionic acid in a mixture of propionic acid and benzene to catalytic pyrogenic dehydration in the vapor phase at a temperature no greater than 1100° F.

2. Process for the production of propionic acid anhydrides, which comprises subjecting propionic acid in a mixture of propionic acid and benzene to catalytic pyrogenic dehydration in the vapor phase at a temperature no greater than 1100° F., and subjecting the reaction vapors to fractionation whereby the water formed is removed therefrom in the form of a constant boiling azeotrope with the benzene.

3. Process for the production of propionic acid anhydride, which comprises subjecting propionic acid in a mixture containing propionic acid and from 1 to 20 parts by weight thereof of benzene to catalytic pyrogenic dehydration in the vapor phase at a temperature no greater than 1100° F.

4. Process for the production of propionic acid anhydride, which comprises subjecting propionic acid in a mixture containing propionic acid and from 1 to 20 parts by weight thereof of benzene to catalytic pyrogenic dehydration in the vapor phase at a temperature no greater than 1100° F., and subjecting the reaction vapors to fractionation whereby the water formed is removed therefrom in the form of a constant boiling azeotrope with the benzene.

5. Process for the production of propionic acid anhydride, which comprises subjecting propionic acid in a mixture containing propionic acid and from 1 to 20 parts by weight thereof of benzene to catalytic pyrogenic dehydration in the vapor phase employing mono-sodium phosphate as catalyst, at a temperature no greater than 1100° F.

6. Process for the production of propionic acid anhydride, which comprises subjecting propionic acid in a mixture containing propionic acid and from 1 to 20 parts by weight thereof of benzene to catalytic pyrogenic dehydration in the vapor phase employing mono-sodium phosphate as catalyst at a temperature no greater than 1100° F., and subjecting the reaction vapors to fractionation whereby the water formed is removed therefrom in the form of a constant boiling azeotrope with the benzene.

JOSEPH E. BLUDWORTH.
MAX O. ROBESON.
HARRY A. TRUBY, Jr.

REFERENCES CITED

The following references are of record in the file of this patent:

UNITED STATES PATENTS

| Number | Name | Date |
|---|---|---|
| 1,570,514 | Meingast | Jan. 19, 1926 |
| 1,815,802 | Scheicher et al. | July 21, 1931 |
| 2,002,085 | Dreyfus | May 21, 1935 |